W. H. CRISSEY.
DETACHABLE POST FOR STORAGE BATTERIES.
APPLICATION FILED SEPT. 15, 1919.
1,403,737.
Patented Jan. 17, 1922.
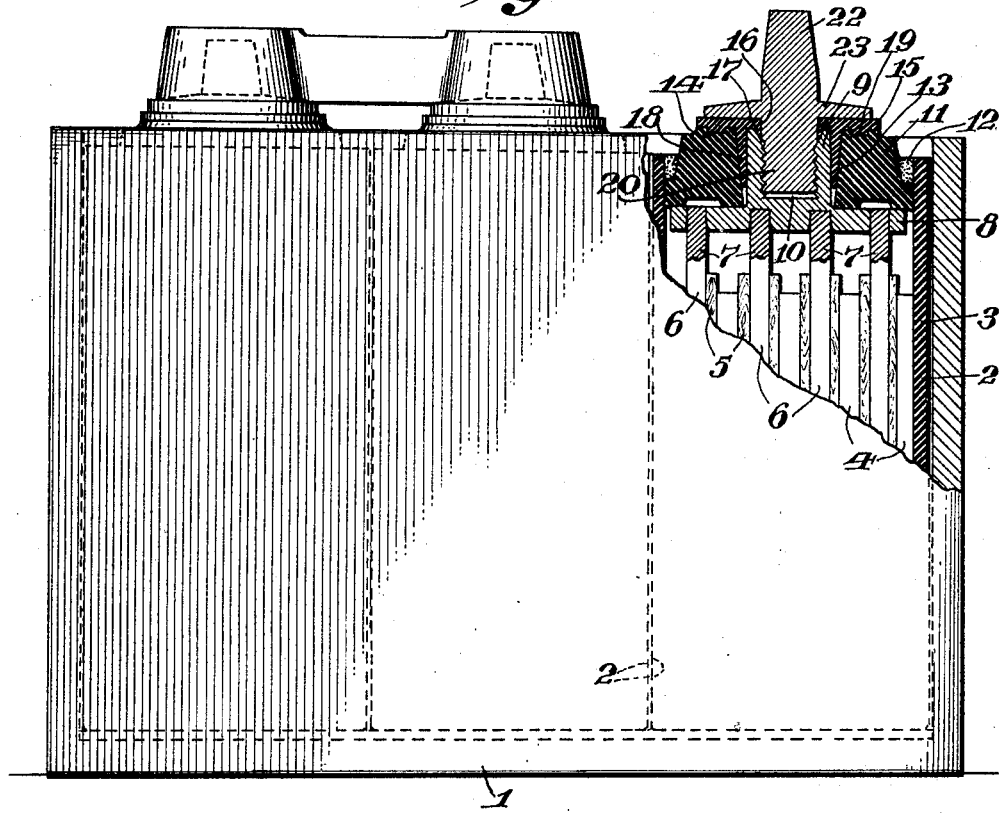
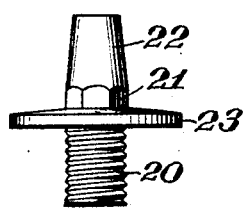
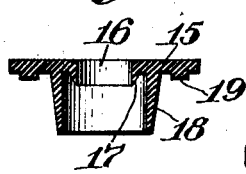
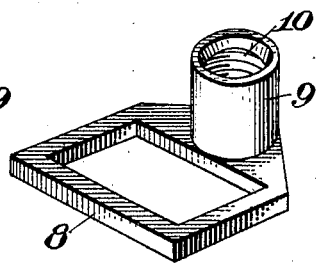
INVENTOR
Walter H. Crissey,
BY J. Stuart Freeman,
ATTORNEY

UNITED STATES PATENT OFFICE.

WALTER H. CRISSEY, OF PHILADELPHIA, PENNSYLVANIA, ASSIGNOR, BY DIRECT AND MESNE ASSIGNMENTS, OF THREE-FOURTHS TO WILLIAM KNOBLOCK, AND ONE-FOURTH TO AMERICAN ELECTRIC STORAGE BATTERY COMPANY, OF PHILADELPHIA, PENNSYLVANIA, A CORPORATION OF DELAWARE.

DETACHABLE POST FOR STORAGE BATTERIES.

1,403,737.        Specification of Letters Patent.        Patented Jan. 17, 1922.

Application filed September 15, 1919. Serial No. 323,994.

*To all whom it may concern:*

Be it known that I, WALTER H. CRISSEY, a citizen of the United States, residing at Philadelphia, in the county of Philadelphia and State of Pennsylvania, have invented certain new and useful Improvements in Detachable Posts for Storage Batteries, of which the following is a specification.

The object of this invention is to provide an improvement in the construction of storage batteries, and particularly in the formation of the post and the means for connecting the same to the pillar-strap and permanent post carried by the electrodes.

Another object is to provide an improved detachable post, for connecting leads to a battery cell, said post being screwed directly into a portion of the permanent post rising from the pillar-strap, and surrounded by a soft rubber gasket, which extends into the aperture in the cover of the cell, and separates the last-named post from said cover, also separating said cover from the peripheral flange portion of the detachable post.

This improved construction is for the purpose of efficiently sealing a storage battery cell so that even when inverted none of the electrolyte will be able to spill therefrom, yet which connection can be severed at will by the use of an ordinary monkey-wrench.

With these and other objects and details of construction and operation in mind, the present invention comprises certain novel features which are fully brought out in the following description, when read in conjunction with the accompanying drawings, in which Fig. 1 is a side elevation of a storage battery, showing the upper portion of one of the cells thereof in section; Fig. 2 is a detail view of the improved detachable post; Fig. 3 is a detail diametrical sectional view of the soft rubber sealing gasket; and Fig. 4 is a detail perspective view of the battery pillar-strap.

Referring to the drawings, a storage or secondary battery is shown in Fig. 1 as comprising a box or container 1, in which are positioned a plurality of jars 2, each of said jars having substantially parallel upwardly extending walls 3, and between said walls containing the usual electrodes 4 of a given polarity, while between the electrodes of this first set and spaced therefrom by insulating discs 5 is a second set of electrodes 6, carrying upwardly extending pillars 7, spanned and connected in unitary relation to one another by means of the pillar-strap 8, which in turn comprises an integral upwardly extending permanent post 9, having an axially positioned internally threaded aperture 10 extending downwardly from the uppermost free end of said post.

Each of the cells is closed at the top by means of a hard rubber cover 11, which may bear directly against and set solidly upon the upper surface of the pillar-strap 8, the union or seam between said cover and the adjacent edge portion of the cell walls 3 being closed by any suitable cement 12, said cover being also provided with a plurality of transversely centrally positioned apertures 13, the sides of which diverge outwardly, while co-axial with said aperture the uppermost surface of the said cover is provided with a groove 14.

As shown in Fig. 1, the cover 11 of each cell surrounds the permanent post 9, which latter extends axially through the cover's aperture 13. A pure soft rubber gasket is then provided to fit down partially over and surrounding said permanent post, said gasket comprising a disc portion 15 centrally apertured at 16, while immediately surrounding said aperture is a depending, downwardly tapering flange 17. Said disc is further provided with a second and downwardly depending flange 18 of greater diameter than said first-named flange, for a purpose hereinafter described; and finally said cap is provided between its radially outer edge portion and said last-named flange with a downwardly depending flange 19 of restricted depth.

This cap or gasket is placed upon the cover 13 in such position that the flange 19 enters the groove 14, the flange 18 enters the opening between and separates the permanent post from the surrounding cell cover, and the flange 17 enters the peripheral edge portion of the threaded aperture 10 in said permanent post. With the said gasket in the position thus described, a detachable post, comprising an externally threaded shank portion 20, is screwed firmly into the position shown in Fig. 1 into the aperture of said permanent post by means of any suitable wrench co-operating with the polygonally shaped portion 21 of the upwardly extending terminal section 22. A radially extending flange 23 is also provided as a part of the detachable post, the same having an under surface adapted to co-operate with the upper surface of said gasket and to force the same together with its flange portions respectively against the said permanent post and cell cover and into the several grooves as hereinbefore described.

With the construction thus described, it is obvious that a battery post has been provided which, when firmly secured into normal operative position, will be as secure and permanent as any which have been developed, but which can be detached from the permanent post of the pillar-strap with the utmost ease by means of any suitable wrench.

And, furthermore, a seal has been provided for the upper open end of a storage or secondary cell of such construction that not so much of a drop of the usual electrolyte therefrom can escape, even should the cell be agitated in inverted position.

Having thus described my invention, what I claim and desire to protect by Letters Patent of the United States is:—

1. In a storage battery cell, the combination of a cover having an aperture, adapted to receive the permanent post of a pillar-strap, with a threaded detachable post, adapted to be removably screwed upon said first post and extend through said aperture.

2. In a storage battery cell, the combination of a cover having an aperture, and the permanent threaded post of a battery strap extending through said aperture, with a gasket also extending into said aperture and having a flange portion covering said cover adjacent to said aperture, and a threaded detachable post adapted to enter said aperture, to removably engage said permanent post, and to firmly co-operate with said gasket to seal said aperture.

3. In a storage battery cell, the combination of a cover having an aperture, and a permanent post of a battery strap having a threaded aperture and extending into the aperture of said cover, with a yielding gasket also extending into said cover aperture between said post and the sides of said last-named aperture, said gasket having a flanged portion covering said cover adjacent to its said aperture, and a detachable post entering said cover aperture in removable threaded engagement with said first-named post and firmly co-operating with said gasket to seal or force the same against said cover, to seal said cover aperture.

4. In a storage battery cell, the combination of a cover having an aperture with outwardly diverging side walls, and the permanent post of a battery-strap extending into said aperture and said post itself having a threaded aperture, with an enlarged outer portion, said cover having a groove surrounding and spaced from its said aperture, a soft yielding gasket extending into said groove, into the enlarged portion of said post aperture, and into said cover aperture around said post, and a second post removably engaging the threaded portion of said first post and having a flange engaging said gasket and forcing it into the said groove and said apertures, to positively seal the aperture in said cover.

5. The combination of a pillar-strap for connecting grids of a storage battery with a permanent post forming an integral projection of said pillar-strap and being threaded, and a detachable post in normal threaded engagement with said permanent post and adapted to comprise an electrical terminal for a storage battery.

In testimony whereof I have affixed my signature.

WALTER H. CRISSEY.